US012173551B2

(12) United States Patent
Salice

(10) Patent No.: US 12,173,551 B2
(45) Date of Patent: Dec. 24, 2024

(54) DECELERATED HINGE FOR FURNITURE AND METHOD FOR ASSEMBLING A DECELERATING DEVICE IN A FURNITURE HINGE

(71) Applicant: ARTURO SALICE S.P.A., Novedrate (IT)

(72) Inventor: Sergio Salice, Carimate (IT)

(73) Assignee: ARTURO SALICE S.P.A., Novedrate (IT)

(*) Notice: Subject to any disclaimer, the term of this patent is extended or adjusted under 35 U.S.C. 154(b) by 0 days.

(21) Appl. No.: 18/112,428

(22) Filed: Feb. 21, 2023

(65) Prior Publication Data

US 2023/0304343 A1 Sep. 28, 2023

(30) Foreign Application Priority Data

Mar. 23, 2022 (IT) ........................ 102022000005594

(51) Int. Cl.

| | |
|---|---|
| ***E05F 1/08*** | (2006.01) |
| ***E05D 5/06*** | (2006.01) |
| ***E05F 3/10*** | (2006.01) |

(52) U.S. Cl.

CPC .............. *E05F 3/108* (2013.01); *E05D 5/065* (2013.01); *E05Y 2900/20* (2013.01)

(58) Field of Classification Search

CPC ........... E05Y 2900/20; E05Y 2900/202; E05Y 2900/204; E05Y 2900/208; E05Y 2201/20;

(Continued)

(56) References Cited

U.S. PATENT DOCUMENTS 8,561,262 B1 * 10/2013 Liang ........................ E05F 5/04 16/296
8,650,711 B1 * 2/2014 Chen ....................... E05F 5/006 16/296

(Continued)

FOREIGN PATENT DOCUMENTS

CN 208056889 11/2018
EP 2749722 7/2014

(Continued)

OTHER PUBLICATIONS

Italian Searh Report of Italian Application No. 202200005594; Issued Nov. 1, 2022.

(Continued)

*Primary Examiner* — Chuck Y Mah
(74) *Attorney, Agent, or Firm* — Ferguson Case Orr Paterson

(57) ABSTRACT

A decelerated hinge for furniture, which comprises a hinge arm, a hinge box fixable to a door and swingably connected to the hinge arm by an articulation axis at a rear wall of the hinge box, elastic closing means for closing the hinge and a linear-type decelerating device comprising a housing body, a slider, a fluid damper and elastic return means, wherein the hinge box has at least one opening in at least one of a front and/or side walls, and wherein the housing body has at least a retaining protrusion conformed and arranged to be inserted in the at least one opening in such a way to be protruding outside the hinge box, wherein the retaining protrusion inserted in the opening cooperates with fixing means by which the housing body is fixed in the hinge box.

12 Claims, 2 Drawing Sheets

(58) Field of Classification Search
CPC ........... E05Y 2201/21; E05Y 2201/214; E05Y 2201/216; E05Y 2201/256; E05Y 2201/264; E05Y 2201/266; E05Y 2201/638; E05F 3/108; E05F 5/006; E05F 5/02; E05F 5/10; E05D 11/1021; E05D 11/1042; E05D 11/105; E05D 11/1064; E05D 5/065; E05D 7/04; E05D 7/0407; E05D 7/123; E05D 7/125; E05D 3/142
See application file for complete search history.

(56) References Cited

U.S. PATENT DOCUMENTS

| | | | | |
|---|---|---|---|---|
| 9,163,447 | B1 * | 10/2015 | Liang | E05F 5/006 |
| 9,874,049 | B1 * | 1/2018 | McGregor | E05D 5/065 |
| 10,428,896 | B2 * | 10/2019 | Zimmer | F16F 9/19 |
| 11,078,705 | B2 * | 8/2021 | Salice | E05F 1/1246 |
| 2011/0291538 | A1 * | 12/2011 | Brunnmayr | E05D 11/08 16/382 |
| 2012/0174338 | A1 * | 7/2012 | Wu | E05F 5/08 16/297 |
| 2014/0366322 | A1 * | 12/2014 | Salice | E05F 5/02 16/277 |
| 2017/0107749 | A1 * | 4/2017 | McGregor | E05F 5/006 |
| 2018/0355651 | A1 * | 12/2018 | Liang | E05D 11/00 |
| 2019/0242167 | A1 | 8/2019 | Salice | |
| 2019/0309554 | A1 | 10/2019 | Scharer | |
| 2021/0032919 | A1 * | 2/2021 | Peer | E05F 5/006 |
| 2021/0189780 | A1 | 6/2021 | Nordieker | |
| 2021/0404230 | A1 | 12/2021 | Giovannietti | |
| 2022/0195768 | A1 | 6/2022 | Schneider | |
| 2022/0195776 | A1 | 6/2022 | Giovannetti | |
| 2023/0272655 | A1 | 8/2023 | Baldreich | |

FOREIGN PATENT DOCUMENTS

| | | |
|---|---|---|
| JP | 2020523508 | 8/2020 |
| WO | 2018147817 | 8/2018 |

OTHER PUBLICATIONS

Office Action issued in U.S. Appl. No. 18/025,610; mailed Apr. 9, 2024.

Office Action issued in U.S. Appl. No. 18/025,610 issued Sep. 17, 2024.

* cited by examiner

DECELERATED HINGE FOR FURNITURE AND METHOD FOR ASSEMBLING A DECELERATING DEVICE IN A FURNITURE HINGE

RELATED APPLICATION

The present application claims the priority benefit of Italian Pat. App. No. 102022000005594 to Salice, filed on Mar. 23, 2022, which is fully incorporated by reference herein in its entirety.

BACKGROUND OF THE DISCLOSURE

Field of the Disclosure

The invention concerns a decelerated hinge for furniture doors, in particular a hinge suitable for being applied on furniture provided with a front frame for fixing said hinges, as well as it also concerns a method for assembling a decelerating device in a furniture hinge.

Description of the Related Art

In the furniture sector, in order to swingably support the furniture doors, hinges are generally used, comprising a hinge arm or fixed part that can be connected to the furniture body and a movable part, in the form of a box or box-shaped element, that can be connected to the door.

In the case of furniture with a front frame for fixing the hinges, typically used on the American market, said hinges generally provide that the box is connected to the hinge arm by a single articulation pin.

In order to keep the door in the closed position, the hinges also comprise appropriate elastic means, for example in the form of torsion springs positioned at the side walls of the box, or in the form of a leaf spring fixed inside the box in a central position and loaded so as to stress the hinge arm in the hinge closing direction.

In order to prevent the door from colliding with the furniture body by the effect of the elastic closing means, the hinges may be fitted with a decelerating device, preferentially a linear-type, able to decelerate the closing movement of the hinge.

A hinge of this kind provided with a decelerating device is for example known from WO 2009/094272; in this hinge, the decelerating device is entirely positioned inside the hinge box and comprises a slider operated by the hinge arm, a return spring and a fluid damper to decelerate the movement of the slider. A cover or housing body is also provided, which is conformed to hold the slider and other components inside the hinge box.

In general, the cover or housing body is fixed in the hinge box by means of a snap coupling; however, this type of fixing proved to be unreliable, leading to the risk that the decelerating device may release and that the hinge would no longer function properly.

In addition, during the assembly phase of the hinges on the doors, it may happen that there is a gap between the hinge box and the respective insertion hole provided in the door, therefore, until the box is not fixed to the door by screws or other fixing means, there is a risk that the hinges will disengage from the door.

SUMMARY OF THE DISCLOSURE

The main purpose of this invention is therefore to provide a decelerated hinge for furniture doors, in particular for furniture provided with a front fixing frame, which has a stably and reliably fixed decelerating device.

Another purpose of this invention is to provide a decelerated hinge for furniture doors of the kind in question, that allows to simplify the assembly of said hinges on the doors.

A further purpose of the present invention is to provide a method for reliably assembling and fixing a decelerating device to a furniture hinge, in particular for furniture provided with a front fixing frame.

The above can be achieved by means of a decelerated hinge for furniture, comprising: a hinge arm fixable to a body of a piece of furniture; a hinge box fixable to a door of the piece of furniture, the hinge box being swingably connected to said hinge arm by an articulation axis at the rear wall of the hinge box, wherein the hinge box further has a front wall, side walls and a bottom wall; elastic closing means for closing the hinges, and a linear-type decelerating device comprising a slider, a fluid damper and elastic return means, wherein the decelerating device further comprises a housing body for housing said slider, said fluid damper and said elastic return means, wherein the housing body is arranged in the hinge box and fixed therein by fixing means, characterized in that said hinge box has at least one opening in at least one of said front and/or side walls, and in that said housing body has at least a retaining protrusion conformed and arranged to be inserted in said at least one opening in such a way to be protruding outside the hinge box, said retaining protrusion inserted in said opening cooperating with said fixing means for anchoring said housing body to the hinge box.

The above can also be achieved by a method for assembling a decelerating device in a furniture hinge, wherein the hinge comprises a hinge arm fixable to a body of a piece of furniture and a hinge box fixable to a door of the piece of furniture and swingably connected to said hinge arm by an articulation axis at a rear wall of the hinge box, wherein the hinge box further has a front wall, side walls and a bottom wall, wherein the decelerating device comprises a housing body, a slider, a fluid damper and elastic return means, characterized by the steps of: providing at least one opening in at least one of said front and/or side walls of the hinge box, providing at least one retaining protrusion on said housing body, positioning the decelerating device in the hinge box providing the insertion of the at least one retaining protrusion in the at least one opening provided in the walls of the hinge box, in such a way that the at least one protrusion protrudes out from the same hinge box, and fixing the decelerating device by fixing means cooperating with said retaining protrusion for anchoring the housing body to the hinge box.

Further features of this invention are also defined in subsequent claims.

BRIEF DESCRIPTION OF THE DRAWINGS

Features and advantages of the present invention will be more evident from the subsequent description of a preferential but not limiting embodiment of the decelerated hinge for furniture, with reference to the attached figures, in which.

DETAILED DESCRIPTION OF THE DISCLOSURE

Figure 1:
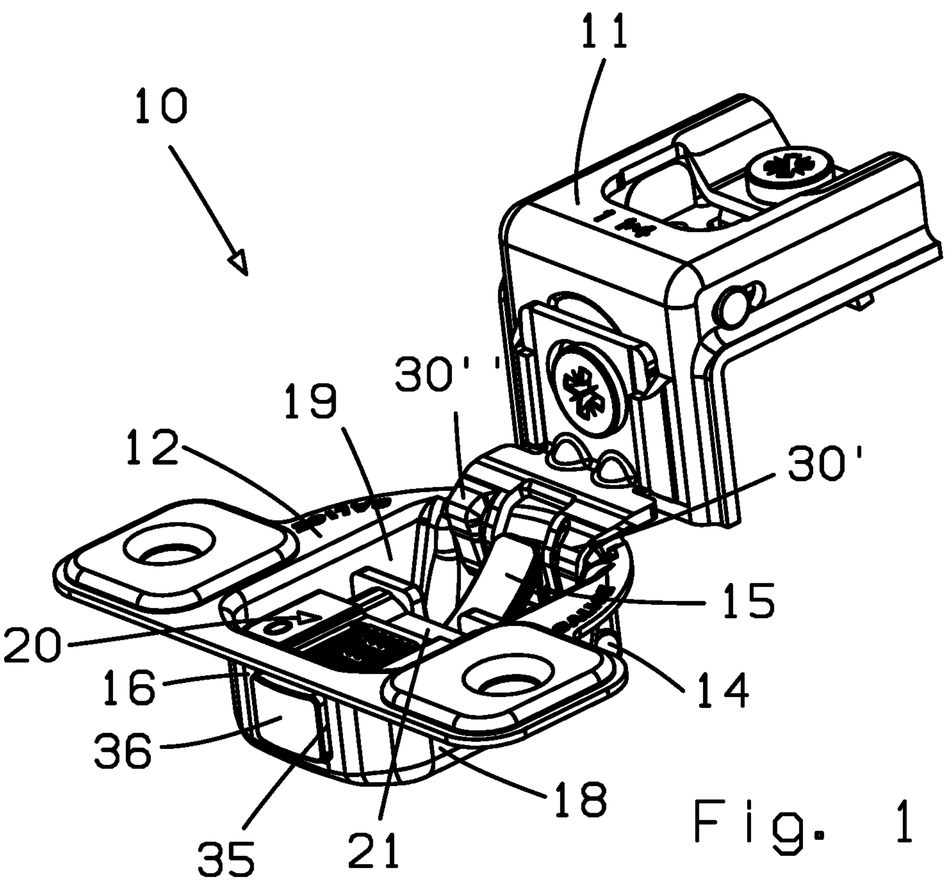
FIG. 1 is a perspective view of the hinge according to the invention.
Figure 2:
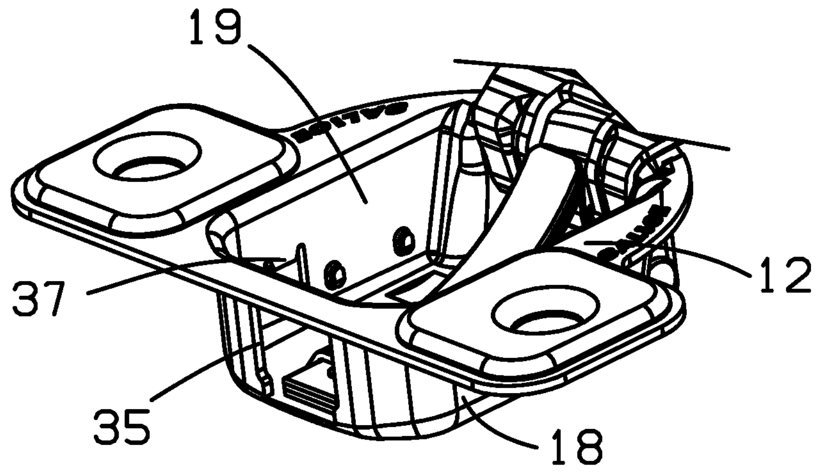
FIG. 2 is the perspective view of the hinge in FIG. 1 with the decelerating device not yet inserted into the hinge box.

The hinge according to the present invention, overall indicated in the attached figures with the reference number 10, is particularly suitable to be configured for an application to American-type furniture provided with a front frame on which the hinges are fixed.

This type of hinge 10 in general comprises a hinge arm 11 for fixing said hinge to a fixed part or a body of a piece of furniture, in particular to the front frame, and a hinge box 12 fixable to a furniture door.

The box 12 is swingably connected to the fixing arm 11 at a rear wall 13 of said box 12, preferably by an articulation axis 14 extending transversely with respect to a longitudinal axis according to which the fixing arm 11 extends, in such a way that the box 12 can rotate between a door opening position and a door closing position under the action of elastic closing means of a known type, for example, at least one leaf spring 15, centrally and longitudinally arranged inside the box 12 and conformed to act on the hinge arm 11, in particular on a cam-shaped part of said arm 11.

Figure 3:
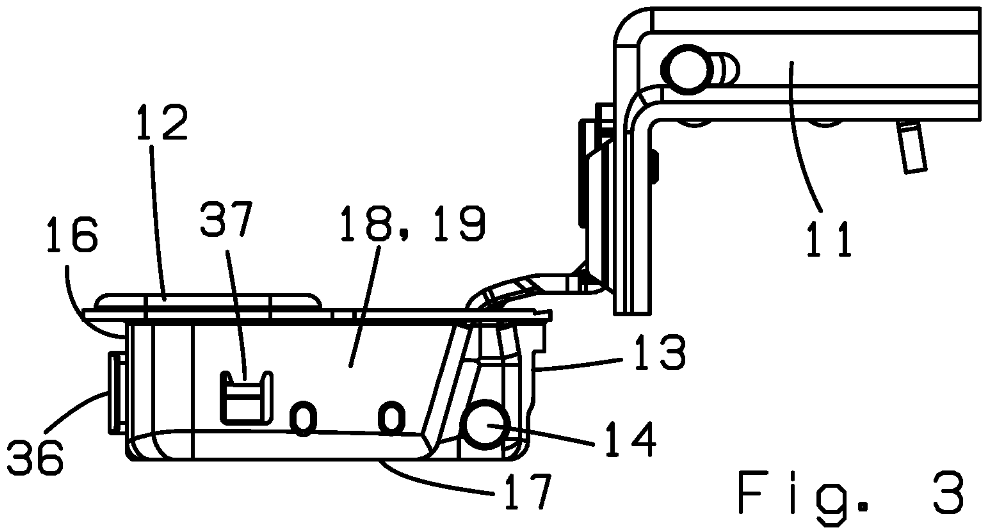
FIG. 3 is a side view of the hinge of FIG. 1.
Figure 4:
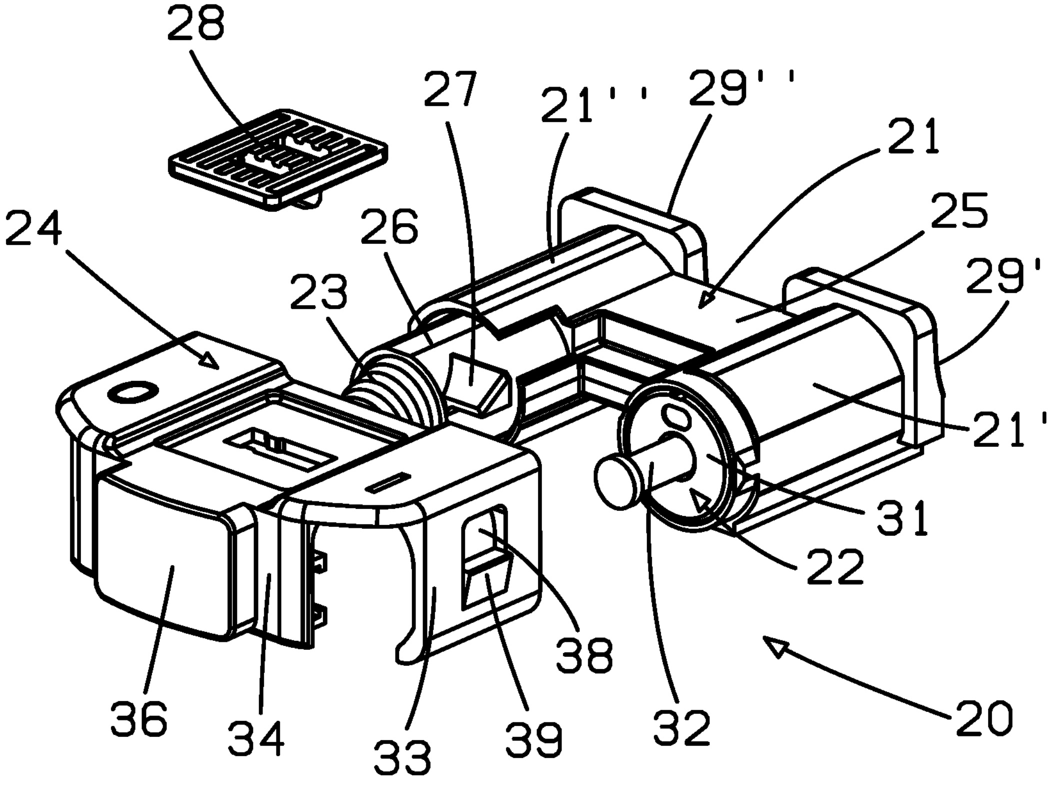
FIG. 4 is an exploded view of the decelerating device of the hinge according to the invention.

As shown in FIG. 3, the hinge box 12 also comprises a front wall 16, a bottom wall 17 and side walls 18, 19 extending longitudinally on opposite sides of the box 12 starting from the rear wall 13.

The hinge 10 also comprises a linear decelerating device 20, arranged inside the box 12, which comprises a slider 21, a fluid damper 22, preferably in the form of a fluid decelerating cylinder, and elastic return means 23 operatively connected to each other.

The decelerating device 20 also comprises a housing body 24 for housing the slider 21, the fluid damper 22 and the elastic return means 23, wherein the housing body 24 is arranged in the hinge box 12 and fixed therein by fixing means, as explained below.

In the preferential embodiment illustrated, the fluid damper 22 and the elastic return means 23 extend parallel and spaced apart, with the fluid damper cylinder arranged at a first side wall 18 of the box 12 and the elastic return means 23 arranged at the opposite side wall 19 of the box 12, thus having the cylinder 22 and the return means 23 separate arrangement with each another.

In particular, the fluid damper cylinder 22 and the elastic return means 23 extend parallel and spaced along opposite sides of the hinge closing leaf spring 15.

The housing body 24 of the decelerating device 20 is fixable in the hinge box 12 at its front end and the slider 21 is arranged slidingly between the housing body 24 and the bottom wall 17 of the box 12.

The slider 21 is movable between a first extended position, at the opening position of the illustrated hinge, and a second contracted position at the closing position of the hinge.

The fluid damper 22 comprises a piston, not illustrated, movable in a chamber for the fluid, in which the fluid preferentially consists of oil or other viscous fluid.

Preferentially, the slider 21 comprises a first 21' and a second 21" hollow cylindrical part operatively connected to each other, for example by means of a transverse connecting element 25, which extend parallel and spaced apart; the first hollow cylindrical part 21' defines the chamber for the piston of the damper cylinder, while the second hollow cylindrical part 21" defines a housing seat for the elastic return means 23 which are interposed between the slider 21 and the housing body 24.

The elastic return means 23, which are provided to take the slider 21 back to the first extended position when the hinge is opened, are preferentially in the form of a coil spring inserted into a cup-shaped retaining element 26 slidingly arranged inside the second hollow cylindrical part 21" of the slider, so as to make the slider 21 structurally independent from the elastic return means; the cup-shaped retaining element 26 has a side protrusion 27 selectively engageable with a locking member 28 movably arranged on the housing body 24, preferentially movable in a cross-direction.

In particular, the locking member 28 may be moved by an user between a locking position, where it engages with the lateral protrusion 27 so as to limit the stroke of the retaining element 26 and thus prevent the return spring 23 from taking the slider 21 back to the first extended position, and a release position, in which the return spring 23, through the retaining element 26, is able to exert its elastic thrust on the slider 21 to take it back to the first extended position when the hinge is returned to the opening position; thanks to the locking member 28 it is therefore possible, if necessary, to reduce the decelerating action exerted by the decelerating device, preventing a complete return of the slider 21.

For the purpose of actuating the decelerating device, the first and second cylindrical parts 21', 21" of the slider 21 at a rear end have respective walls provided with contact shaped surfaces or cams 29', 29" for contacting with corresponding control surfaces 30', 30" provided on the hinge arm 11.

The decelerating cylinder 22 comprises an annular cover 31 for closing the chamber, fixable to the front end of the first cylindrical part 21', through which the rod 32 of the piston extends, ending with a head hookable to the housing body 24 of the decelerating device.

Preferentially, the housing body 24 has two side walls 33 that extend according to a U-shaped cross-section and comprises a front wall 34.

For the purpose of operating the decelerating device 20, at least a fluid-passage groove extending longitudinally along at least part of the inner cylindrical surface of the first cylindrical part 21' is provided in the piston chamber.

According to the present invention, in order to ensure a reliable and safe fixing for the decelerating device 20, the hinge box 12 has at least one opening in at least one of said front 16 and/or side 18, 19 walls, preferentially an opening 35 in the front wall 16 of the hinge box 12; moreover, again according to the present invention, the housing body 24 has at least one retaining protrusion, preferentially a retaining protrusion 36 formed on the front wall 34 of the housing body, wherein the retaining protrusion 36 is conformed and arranged to be inserted in said at least one opening 35 in such a way to be protruding outside the hinge box 12.

It is not excluded that the at least one opening for the insertion of the retaining protrusion may be provided in a different wall of the box 12, for example, in a side wall 18, 19, nor that more than one protrusion may be provided, for example depending on the shape and arrangement of the various parts that make up the hinge.

The retaining protrusion 36 which protrudes through the opening 35 of box 12 cooperates with additional fixing means to anchor the housing body 24 to hinge box 12.

Preferentially the additional fixing means comprise fixing wings 37 provided in the side walls 18, 19 of box 12, said fixing wings being mechanically bent by means of punches during assembling of the decelerating device 20 in the hinge box 12 in such a way to penetrate in openings 38 provided in the side walls 33 of the housing body 24.

The combined action of the retaining protrusion 36 and the fixing wings 37 provides a firm retaining for the decelerating device 20, so as to prevent it from being disengaged from hinge box 12; in order to increase the fixing safety, the retaining protrusion 36 is preferable that it protrudes from the opening 35 of the box 12 by an extent of at least twice as much the metal sheet thickness of the box 12, for example, 1.2 mm in the case of a metal sheet with a thickness of 0.6 mm, in such a way as to avoid the danger that the retaining protrusion 36 may disengage from the opening 35 in the hinge box 12.

The retaining protrusion 36 can be advantageously used to hold the hinge box 12 in the hole provided in the door for fixing it until the fixing means are applied, for example the usual fixing screws; in particular by appropriately configuring the shape and extent of the protrusion of the retaining protrusion 36 in such a way to forcedly contact the inner peripheral surface of the hole in the door, it is possible to exploit the elasticity of the material with which the housing body 24 and its retaining protrusion is made, for example a suitable plastic material, to obtain a sufficient retaining action that prevents the hinge box 12 from disengaging from the hole in the door before inserting the relevant fixing means.

Preferentially the housing body 24 has side elastic wings 39 engageable by friction and/or mechanically with the side walls 18, 19, in such a way as to allow a first anchoring of the decelerating device 20 inside the box 12 during the assembly steps of the decelerating device 20, before the fixing wings 37 are mechanically deformed to non-releasably hold the decelerating device 20 in the hinge box 12.

For the purpose of assembling the decelerating device 20 in the hinge according to the invention it is therefore necessary to:

- provide at least one opening 35 in at least one of the front 16 and/or side 18, 19 walls of the hinge box 12,
- provide at least one retaining protrusion 36 on the housing body 24,
- position the decelerating device 20 in the hinge box 12 providing the insertion of at least one retaining protrusion 36 in the at least one opening 35 provided in the walls of the hinge box 12 in such a way that the at least one protrusion 36 protrudes out from the same hinge box 12, and
- fix the decelerating device 20 by fixing means 37 cooperating with the retaining protrusion 36 for anchoring the housing body 24 to the hinge box 12.

Preferentially, the positioning step of the decelerating device 20 in the hinge box 12 can be done by first inserting the decelerating device 20 slanted within the box 12, in such a way to insert the retaining protrusion 36 in the opening 35 and then turning the decelerating device 20 in such a way to bring it in contact with the bottom wall 17 of the hinge box 12.

From the above it is evident that the decelerated hinge according to the invention has a decelerating device safely and reliably fixed.

In addition, the hinge according to this invention allows to simplify the assembly of the hinges on the doors.

The invention also provides a method for reliably assembling and fixing the decelerating device to a hinge for furniture.

The hinge and its assembly method according to the invention are susceptible to modifications and variations within the scope of the inventive concept; in addition, the construction details can be replaced by technically equivalent elements.

I claim:

1. A decelerated hinge for furniture, comprising:
- a hinge arm fixable to a body of a piece of furniture;
- a hinge box fixable to a door of the piece of furniture, the hinge box being swingably connected to said hinge arm by an articulation axis at a rear wall of the hinge box, wherein the hinge box further has a front wall, side walls and a bottom wall;
- elastic closing means for closing the hinge; and
- a linear-type decelerating device comprising a slider, a fluid damper and elastic return means, wherein the decelerating device further comprises a housing body for housing said slider, said fluid damper and said elastic return means, wherein the housing body is arranged in the hinge box and fixed therein by fixing means,
- characterized in that said hinge box has at least one opening in at least one of said front and/or side walls, and
- in that said housing body has at least one retaining protrusion conformed and arranged to be inserted in said at least one opening in such a way to be protruding outside the hinge box, said retaining protrusion inserted in said opening cooperating with said fixing means for anchoring said housing body to the hinge box.

2. The hinge of claim 1, characterized in that said retaining protrusion protrudes from the opening of the box of an extent of at least twice as much the sheet thickness of the box.

3. The hinge of claim 2, characterized in that said retaining protrusion is conformed and protruding from the opening of the box in such a way to contact an inner peripheral surface of a hole provided in the door for inserting the hinge box.

4. The hinge of claim 1, characterized in that said retaining protrusion is conformed and protruding from the opening of the box in such a way to contact an inner peripheral surface of a hole provided in the door for inserting the hinge box.

5. The hinge of claim 1, characterized in that said fixing means comprise fixing wings provided in the side walls of the box, said fixing wings being mechanically bent during assembling of the decelerating device in the hinge box in such a way to penetrate in openings provided in side walls of the housing body.

6. The hinge of claim 5, characterized in that the housing body has lateral elastic wings engagable by friction and/or mechanically with the side walls of the hinge box.

7. The hinge of claim 1, wherein said elastic closing means is arranged centrally and longitudinally inside said hinge box.

8. The hinge of claim 1, wherein said slider comprises a first hollow cylindrical part and a second hollow cylindrical part that are operatively connected to, parallel to, and spaced apart from each other;
- wherein said fluid damper comprises a piston; and
- wherein said first hollow cylindrical part defines a chamber for said piston.

9. The hinge of claim 8, wherein said fluid damper further comprises an annular cover for closing said chamber, said annual cover fixable to a front end of said first hollow cylindrical part; and
- wherein a rod of said piston extends through said annular cover.

10. The hinge of claim 9, wherein said rod comprises a head that is hookable to said housing body.

11. A method for assembling a decelerating device in a furniture hinge, wherein the hinge comprises a hinge arm fixable to a body of a piece of furniture and a hinge box fixable to a door of the piece of furniture and swingably connected to a hinge arm by an articulation axis at a rear wall of the hinge box, wherein the hinge box further has a front wall, side walls and a bottom wall, wherein the decelerating device comprises a housing body, a slider, fluid damper and elastic return means, characterized by the steps of:

providing at least one opening in at least one of said front and/or side walls of the hinge box, providing at least one retaining protrusion on said housing body, positioning a decelerating device in the hinge box providing the insertion of the at least one retaining protrusion in the at least one opening provided in the walls of the hinge box in such a way that the at least one protrusion protrudes out from the same hinge box, and fixing the decelerating device by fixing means cooperating with said retaining protrusion for anchoring the housing body to the hinge box.

12. The method of claim 11, wherein the step of positioning the decelerating device in the hinge box provides the steps of:

inserting the decelerating device slanted within the box in such a way to insert the retaining protrusion in the opening, and turning the decelerating device in such a way to bring it in contact with the bottom wall of the hinge box.

* * * * *